United States Patent Office 3,399,049
Patented Aug. 27, 1968

3,399,049
METHOD OF CONTROLLING WEEDS
Wilbur F. Evans, Springhouse, Pa., and Thomas F. Wood, Wayne, N.J., assignors, by direct and mesne assignments, to Givaudan Corporation, a corporation of New Jersey
No Drawing. Filed Sept. 28, 1964, Ser. No. 399,872
5 Claims. (Cl. 71—123)

ABSTRACT OF THE DISCLOSURE

A new class of herbicides is disclosed. The active compounds are represented by the formula:

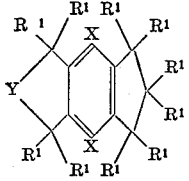

wherein X is selected from the group consisting of hydrogen, methyl and $COR^2$; wherein Y is selected from the group consisting of —$CHR^1$— and

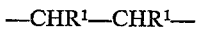

—$CHR^1$—$CHR^1$—

$R^1$ is selected from the group consisting of hydrogen and alkyl radicals containing from 1 to 3 total carbon atoms; and wherein $R^2$ is selected from the group consisting of hydrogen, alkyl radicals of from 1 to 6 total carbon atoms, and cyclo-alkyl groups.

---

This invention relates to the use of certain compounds for purposes of controlling weeds. More particularly, the invention relates to the use of compounds having the structure:

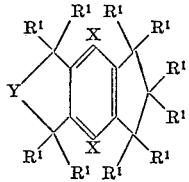

wherein X is selected from the group consisting of hydrogen, methyl and $COR^2$; wherein Y is selected from the group consisting of —$CHR^1$— and

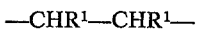

—$CHR^1$—$CHR^1$—

$R^1$ is selected from the group consisting of hydrogen and alkyl radicals containing from 1 to 3 total carbon atoms; and wherein $R^2$ is selected from the group consisting of hydrogen, alkyl radicals of from 1 to 6 total carbon atoms, and cyclo-alkyl groups.

It will be appreciated from the above structural formula that when Y is —$CHR^1$— the compounds are symmetrical hydrindacenes, and when Y is —$CHR^1$—$CHR^1$— the compounds are naphthindanes.

The compounds of the present invention have been found to possess high levels of herbicidal activity and are useful in controlling undesirable plants of both the monocotyledonous and dicotyledonous species on a pre-emergence basis. It has also been discovered that the compounds of the present invention possess high rates of herbicidal activity on both emerged and submerged aquatic weed species.

By "pre-emergence" is meant that the compound is applied to the soil prior to emergence of the weed species sought to be controlled. This term, as used herein, also means the application of the herbicidal compounds falling within the scope of this disclosure to areas wherein useful or desirable plants are growing but where weeds sought to be controlled have not as yet emerged.

In order to illustrate the herbicidal activity of the compounds falling under the purview of this invention there are presented below a series of test results which are reported solely by way of illustration and which are not intended to be construed as in any way limiting the scope of this invention.

Example I

Weed seeds of the species foxtail (*Setaria faberii*), chickweed (*Stellaria media*), pigweed (*Amaranthus retroflexus*), lambsquarter (*Chenopodium album*) and curled dock (*Rumex crispus*) were planted in soil under greenhouse conditions and immediately following planting the soil surface was sprayed with an aqueous emulsion of the compound 2,3,5,6,7,8 - hexahydro - 1,1 - dimethyl-1H-benz(f)-inden-4-ylmethylketone so as to apply thereto an amount equivalent to 16 lbs./acre of the herbicidal agent. Two weeks following spray application, inspection of the treated area revealed that from 90 to 100% control was obtained over the seeded plant species as compared with the control plot.

Example II

Crabgrass (*Digitaria ischaemum*) and lambsquarter (*Chenopodium album*) seeds were sown in soil and immediately following sowing an amount equivalent to 16 lbs./acre of 2,3,5,6,7,8-hexahydro-1,1-dimethyl-1H-benz-(f)indene was applied in the form of an aqueous emulsion to the soil surface. Two weeks after spraying the treated area was inspected and it was found that from 70 to 100% control was obtained over the growth of the seeded weeds.

Example III

An application of the equivalent of 16 lbs./acre of the compound 2,3,5,6,7,8 - hexahydro - 1,1,5,5,8,8-hexamethyl-1H-benz(f)indene was applied to newly sown wild oats (*Avena fatua*) using a solution of the compound in alcohol and aromatic mineral oil. Two weeks following spray treatment inspection showed that 80% control was obtained over this undesirable plant species.

Example IV 1,1,7,7-tetramethyl-4-s-hydrindacenylmethyl ketone was applied at the rate of 16 lbs./acre to soil which had been seeded with cheatgrass (*Bromus secalinus*), foxtail (*Setaria faberii*), barnyard grass (*Echinochloa crusgalli*) and crabgrass (*Digitaria ischaemum*). Application was made using a solution of the compound in methylated naphthalene-alcohol co-solvents. Two weeks after application of the chemical to the soil surface an inspection of the area showed that from 90 to 100% control of the growth of the weed species was obtained.

Example V

An oil emulsion of 1,1,4,7,7-pentamethyl-s-hydrindacene was sprayed over soil newly sown to cheatgrass (*Bromus secalinus*), crabgrass (*Digitaria ischaemum*) and Johnson grass (*Sorghum halepense*) at a rate sufficient to apply the equivalent of 16 lbs./acre of this compound. Approximately four weeks after spray application an inspection of the treated area showed from 70 to 90% control had been obtained over these undesirable grass species.

For practical use as herbicides, the compounds of this invention may be formulated with conventional agricultural carriers to obtain the desired concentration and to facilitate handling. For example, these compounds may be formulated into dusts by combining them with such materials as talc or clays. Wettable powder formulations may be obtained by adding a dispersing or suspending agent to the dust formulations referred to above.

If desired, the compounds of this invention may be applied as spray solutions which can be prepared by dissolving the compounds in suitable solvents, such as water, xylene, methylated naphthalenes, kerosene, common agricultural oils, etc. in accordance with well established agricultural practices. The choice of solvent to be used will be dictated by the solubility of the compound sought to be sprayed in that particular solvent system. Generally, it has been found that the majority of these compounds have a relatively low order of water solubility, so that the use of common agricultural organic solvents is the preferred practice.

The compounds of this invention may also be emulsified or suspended in water by adding wetting agents or emulsifying agents to aqueous systems containing one or more of the chemical compounds falling under this disclosure. These emulsified formulations are suitable for use in spraying directly upon the locus sought to be protected from undesirable vegetation. So far as has been determined no significant difference in effect is realized from the use of aqueous emulsified formulations or from organic solvent solutions of these herbicides, providing, of course, that a similar amount of chemical is employed in each instance of use.

So far as concerns the amount of herbicide to be used, this is, of course, determined by such considerations as the type of treatment to be made, the area to be treated, the type of weeds sought to be controlled, and the stage of development of the species being sprayed. Generally, however, concentrated herbicidal compositions of the present invention are prepared so as to contain from 5 to about 60% of the active herbicidal component. Compositions which are suitable for use "as is" generally contain from 0.1% to 10% of active herbicidal component.

The compounds of the present invention, being highly active herbicides may be used at relatively low concentrations for certain applications as may be seen from the following example:

Example VI

A water-ethanol solution of 1,1,7,7 - tetramethyl - 4-s-hydrindacenylmethyl ketone was sprayed over ground which was newly sown to cheatgrass (*Bromus secalinus*) and foxtail (*Setaria faberii*) so as to apply the equivalent of 3 lbs. of the active herbicidal agent per acre of soil surface. Two weeks after spraying the treated area was inspected and it was found that 70% control was obtained over these weed species.

Where it is desired to effect essentially complete elimination of vegetation, one or more of the compounds of this invention may be applied at higher rates, such as from 20 to 40 lbs./acre, so as to obtain substantial soil sterilization.

Effective aquatic weed control can be accomplished by very low concentration of the herbicidal compounds of the present invention as may be demonstrated as follows:

Example VII

A rate of 10 parts of the following compounds was added to each million parts of water wherein there was growing emerged aquatic ferns (*Salvinia rotundifolia*) and common duckweed (*Lemna minor*):

Compound A—1,1,7,7,8-pentamethyl-4-s-hydrindacenyl-methyl ketone
Compound B—1,1,7,7-tetramethyl-4-s-hydrindacenyl-methyl ketone
Compound C—2,3,5,6,7,8-hexahydro-1,1-dimethyl-1H-benz(f)indene.

Approximately three weeks after introducing the compounds to the aqueous systems containing the weeds, an inspection revealed from 75% to 100% control was being obtained over the weed species.

The compounds found to be suitable for use in the present invention may be prepared by the condensation of a diolefin with bicyclic-hydrocarbons to form benzindanes or hydrindacenes. These may then be acylated to yield derivatives falling within the scope of this disclosure. Although preparation of these compounds forms no part of the present invention, and such preparations may be accomplished by various methods, there are presented below several detailed examples of preparations of compounds found to be suitable for use in this invention.

Example VIII.—Preparation of 2,3,5,6,7,8-hexahydro-1,1-dimethyl-1H-benz(f)indene A solution of 115 parts of isoprene and 160 parts of tetralin was slowly added to a cold (−4 to 0° C.), rapidly stirred, mixture of 308 parts of 93% sulfuric acid and 750 parts of tetralin over a 4-hour period.

Stirring was continued for 40 minutes at −4 to 0° C., after the addition. On completion of the reaction, stirring was stopped and a lower sulfuric acid layer separated and was removed. The remaining oil was washed successively with water, 5% NaOH solution and 5% NaHCO$_3$ solution.

Unreacted tetralin was recovered by distillation, and 173 parts of 2,3,5,6,7,8 - hexahydro - 1,1 - dimethyl - 1H - benz(f)indene were obtained by vacuum distillation. The product was a colorless liquid, B.P. 108° C. (1.5 mm.), $n_D^{20}$ 1.5450, sp. gr. 25/25° 0.9768.

Example IX.—Preparation of 2,3,5,6,7,8-hexahydro-1,1-dimethyl-1H-benz(f)-inden-4-ylmethyl ketone 70 parts of the above-produced 2,3,5,6,7,8-hexahydro-1,1 - dimethyl - 1H - benz(f)indene were added to a cold (0° C.) well-stirred mixture of 263 parts of carbon tetrachloride, 52.5 parts of granular aluminum chloride and 35.0 parts of acetyl chloride over a period of 3 hours with cooling. Stirring at 1 to 3° was continued for 2 hours longer. Then the batch was quenched on ice. After settling, the lower layer was separated and washed with water and with dilute Na$_2$CO$_3$ solution. After removal of the carbon tetrachloride solvent the product was purified by vacuum distillation. It was obtained as a viscous, pale yellow liquid, B.P. 151–153° C. (2 mm.), $n_D^{20}$ 1.5555 which partially crystallized on standing and amounted to 58 parts. After being crystallized twice from ethanol, the product was a colorless solid, M.P. 83.5–85.0° C.

Example X.—Preparation of 2,3,5,6,7,8-hexahydro-1,1,5,5,8,8-hexamethyl-1H-benz(f)indene Isoprene was condensed with 1,1,4,4-tetramethyl-1,2,3,4-tetrahydronaphthalene in the presence of cold 93% sulfuric acid by a procedure analogous to that disclosed in Example VIII above. The crude product was first vacuum distilled [B.P. 118–120° C. (0.8 mm.)] and then crystallized from twice its weight of ethanol. The product was a colorless solid, M.P. 64.5–65.5° C. The infrared curve showed the absorption at 5.75 which is characteristic of 1,2,4,5-tetra-substituted benzenes. [C. W. Young, R. B. DuVall and N. Wright, Anal. Chem. 23, 709 (1951).]

Example XI.—Preparation of 1,1,7,7-tetramethyl-4-s-hydrindacenyl methyl ketone

A solution of 400 parts of isoprene in 374 parts of benzene was added dropwise into a rapidly stirred mixture of 616 parts of 93% sulfuric acid and 1,200 parts of benzene over a 2½-hour period while the reaction temperature was kept at 25 to 30° C. Stirring was continued at room temperature for 40 minutes after the addition. The batch was then quenched onto 600 parts chipped ice plus 400 parts of ice water with stirring. After settling out, the lower aqueous layer was separated and discarded. The remaining oil layer was washed successively with water, dilute NaOH solution, and dilute NaHCO$_3$ solution. The excess benzene was distilled off and the remaining oil vacuum-distilled. The desired product was obtained in a fraction which boiled at 106 to 115° C. at 2 mm. and which amounted to 132 parts. After three crystallizations from ethanol the product melted at 92 to 94° C.

Following the general procedure as given above in Example IX there was prepared the acetyl derivative, 1,1,7,7-tetramethyl-4-s-hydrindacenyl methyl ketone, a colorless solid having a melting point of 59–61° C.

Example XII.—Preparation of 1,1,7,7-tetramethyl-s-hydrindacen-4-yl-cyclohexylketone 1,1,7,7 - tetramethyl-s-hydrindacene, M.P. 92–94° C., prepared by the method described above in Example XI, was reacted with cyclohexylcarbonyl chloride- aluminum chloride complex using the same reaction conditions as used in Example IX, to produce 1,1,7,7-tetramethyl-s-hydrindacen-4-yl cyclohexylketone.

This compound demonstrated pre-emergence herbicidal activity on undesirable grasses.

Example XIII.—Preparation of 1,1-dimethyl-2,3,5,6,7,8-hexahydro-1H-benz(f)indene-4-carboxaldehyde 1,1-dimethyl-2,3,5,6,7,8 - hexahydro - 1H - benzene(f)-indene-4-carboxaldehyde was prepared as follows: 1,1-dimethyl-2,3,5,6,7,8-hexahydro-1H-benz(f)indene (80 g.), prepared by the method of Example IX above, was added dropwise over a 6-hour period to a cold (−5° C.) well-stirred mixture of 70 g. anhydrous aluminum chloride, 10 g. titanium tetrachloride and 300 g. ethylene dichloride, previously saturated with an equimolar mixture of CO and HCl gasses. During the 6-hour addition period passage of the carbon monoxide-hydrogen chloride mixture was continued at a slow rate. The reaction mixture was stirred at 3° C. for 3 hours longer and then quenched on ice. The product was washed and worked up in the usual manner for Friedel-Crafts acylation products. There was obtained 1,1-dimethyl-2,3,5,6,7,8-hexahydro-1H-benz(f)-indene-4-carboxaldehyde as a colorless liquid having a boiling point of 147–150° C. (2 mm.) and $n_D^{20}$ 1.5296.

This product exhibits activity as a pre-emergence herbicide.

In similar manner various other compounds, also falling within the scope of this invention, may if desired be prepared. It has been found that herbicidal activity is demonstrated by products recovered from crude reaction products and that purification by way of recrystallization or other means is not essential.

We claim:

1. A method of controlling weeds comprising applying to the locus to be protected a herbicidally effective amount of a compound of the formula:

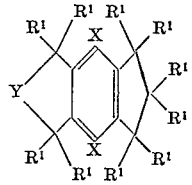

wherein X is selected from the group consisting of hydrogen, methyl and COR²; wherein Y is selected from the group consisting of —CHR¹— and —CHR¹—CHR¹—; R¹ is selected from the group consisting of hydrogen and alkyl radicals containing from 1 to 3 total carbon atoms; and wherein R² is selected from the group consisting of hydrogen and alkyl radicals of from 1 to 6 total carbon atoms.

2. The method of claim 1 wherein the compound is 2,3,5,6,7,8-hexahydro-1,1-dimethyl-1H-benz(f)inden- - 4-ylmethylketone.

3. The method of claim 1 wherein the compound is 2,3,5,6,7,8-hexahydro-1,1-dimethyl-1H-benz(f)indene.

4. The method of claim 1 wherein the compound is 2,3,5,6,7,8 - hexahydro - 1,1,5,5,8,8 - hexamethyl - 1H-benz(f)indene.

5. The method of claim 1 wherein the compound is 1,1,4,7,7-pentamethyl-s-hydrindacene.

References Cited

UNITED STATES PATENTS 3,151,174   9/1964   Wood et al. _____ 260—668
3,244,751   4/1966   Theimer et al. _____ 260—668

LEWIS GOTTS, *Primary Examiner.*

G. HOLLRAH, *Assistant Examiner.*

UNITED STATES PATENT OFFICE
CERTIFICATE OF CORRECTION

Patent No. 3,399,049                              August 27, 1968

Wilbur F. Evans et al.

It is certified that error appears in the above identified patent and that said Letters Patent are hereby corrected as shown below:

Column 1, line 22, "wnerein" should read -- wherein --; line 32, insert as a new paragraph, -- The preparation and application of, and test results obtained with, a member of the compounds are given in 13 specific examples. --; line 72, "compounds" should read -- compound --.

Signed and sealed this 17th day of February 1970.

(SEAL)
Attest:

Edward M. Fletcher, Jr.                      WILLIAM E. SCHUYLER, JR.
Attesting Officer                               Commissioner of Patents